May 26, 1925.
P. MALCAMP
1,539,423
SIGNALING LIGHT FOR MOTOR VEHICLES
Filed Aug. 3, 1922
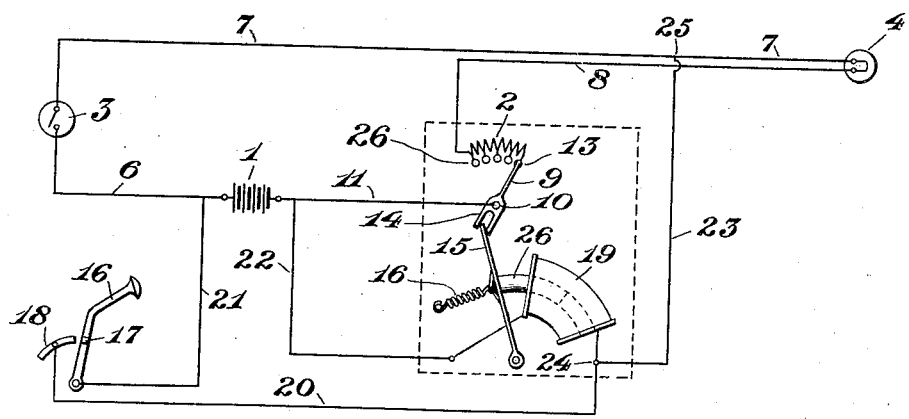
Fig. 1
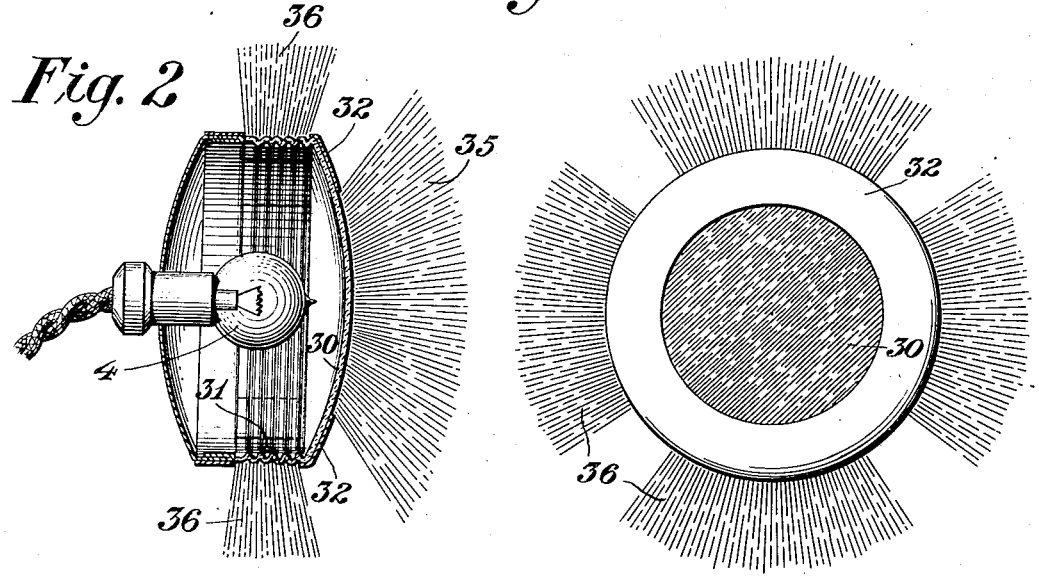
Fig. 2
Fig. 3
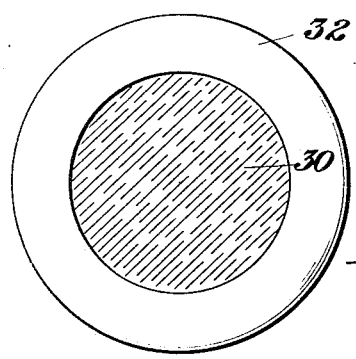
Fig. 4
Philip Malcamp
Inventor
by *T. W. Witherspoon*
Attorney.

Patented May 26, 1925.

1,539,423

UNITED STATES PATENT OFFICE.

PHILIP MALCAMP, OF NEW ORLEANS, LOUISIANA.

SIGNALING LIGHT FOR MOTOR VEHICLES.

Application filed August 3, 1922. Serial No. 579,428.

*To all whom it may concern:*

Be it known that I, PHILIP MALCAMP, a citizen of France, residing at New Orleans, in the parish of Orleans and State of Louisiana, have invented certain new and useful Improvements in Signaling Lights for Motor Vehicles; and I do hereby declare the following to be a full, clear, and exact description of the invention, such as will enable others skilled in the art to which it appertains to make and use the same.

This invention relates to a signaling means for motor vehicles, and has for its object to provide a means which will be more efficient in action, and less costly to install than those heretofore proposed.

With these and other objects in view, the invention consists in the novel details of construction and combinations of parts more fully hereinafter disclosed and particularly pointed out in the claims.

Referring to the accompanying drawings forming a part of this specification, in which like numerals designate like parts in all the views:

Figure 1 is a diagrammatic view illustrating a signal lamp, an electromagnetic means for controlling said lamp, a hand operated switch, and a foot lever for controlling the magnetic means;

Figure 2 is a sectional view of a lamp suitable for use in connection with this invention;

Figure 3 is a front view of said lamp when serving as a danger signal; and

Figure 4 is a front view of said lamp when serving as a tail light.

1 indicates any suitable source of current such as a battery; 3 indicates a switch, 4 an electric lamp, which may be located on the rear of the vehicle, 2 a rheostat, and 5 a lever contact adapted to cut out and cut in coils of the rheostat. The battery 1 is connected to the switch 3 by the wire 6 and the switch is connected to the lamp 4 by the wire 7, while the wire 8 leads from the lamp to the rheostat as shown. The contact lever 9 is pivoted at 10, and is adapted to make circuit with the contacts of said rheostat 2. A wire 11 leads from the pivot 10 back to the battery 1, so when the switch 3 is closed current passes through the lamp 4. But if the lever 9 is making circuit with the last contact 13 of the rheostat, said current will be greatly diminished due to its having to traverse the coils of said rheostat. That is, the lever 9 is provided with the forks 14 between which is located the end of the lever 15, normally held in the position shown by the spring 16, so that the lever 9 normally causes the rheostat to be included in the circuit, and therefore, only enough current passes to make the lamp 4 a tail light.

On the other hand, said lamp may be readily converted from a tail light signal into a danger or flash light signal by the means now to be disclosed. 16 represents a foot lever under the control of the driver of the vehicle, which carries the contact 17 adapted to make circuit with the contact 18 joined to the coils of the solenoid 19 by the wire 20. Said contact 17 is connected to one pole of the battery 1 by the wire 21, and said solenoid coils are connected to the other pole of said battery by the wire 22. A wire 23 is also joined at one end to the wire 7 as at 25. It thus results when the foot lever 16 is moved to make circuit between the contacts 17 and 18, current flows along the wire 21 across said contacts, along the wire 20 through the coils of the solenoid 19 and along the wire 22 back to the battery.

The solenoid being thus energized its core 26 joined to the lever 15 is attracted against the tension of the spring 16, and the lever 9 cuts out the rheostat coils by making circuit with the first rheostat contact 26. The resistance being thus cut out of the lamp circuit, current flows over the wire 23 from the point 24, through said lamp, as well as over the wires 6 and 7 if the switch 3 is still closed, with the result that the lamp is brilliantly and suddenly lighted, and remains thus lighted so long as the circuit is through the contacts 17 and 18.

The lamp 4 may be of any suitable construction so long as it is of a capacity to take a heavy rush of current in the manner disclosed, but it is preferred to provide said lamp with a red glass cover having a convex face 30 and a corrugated or grooved portion 31 at its sides separated by an opaque ring 32.

It will now be clear that in operation at night the switch 3 will be normally closed and the contacts 17 and 18 open, whereupon the resistance will be joined in series with the lamp circuit, and the lamp 4 will therefore function as a tail light or other desired steady signal light. It will also be clear that when it is desired to signal danger or a warning such as turning a corner, etc., the foot lever 16 will be operated to close the contacts 17 and 18 whereupon the resistance will be cut out of the lamp circuit, and the same lamp 4 will flash out signal beams indicated at 35 through the face 30, and other signal beams 36 through the corrugated sides 31. These stronger or more powerful signals will be flashed whether the switch 3 is closed or not, and in fact, they are strong enough to be used in the day time when said switch 3 is normally open. When the lamp 4 is functioning, as a tail light, the resistance so reduces the current that little or no light is observed through the sides 31, and the front face 30 is relatively dim as indicated in Figure 4.

It is obvious that those skilled in the art may vary the details of construction as well as the arrangement of parts without departing from the spirit of the invention, and therefore I do not wish to be limited to the above disclosure except as may be required by the claims.

What I claim is:

1. In a signaling means for motor vehicles, the combination of a lamp; an electric circuit containing a rheostat adapted to light said lamp; a second circuit including a circuit maker under the control of the driver said lamp and said driver also adapted to light said lamp; and means controlled by said circuit maker for cutting said rheostat out of said lamp circuit, substantially as described.

2. In a signaling means for motor vehicles, the combination of an electric lamp adapted to serve as a tail light and to flash auxiliary signals when additional current is passed therethrough; a circuit provided with a rheostat joining said lamp to a source of current; means comprising a circuit for suddenly cutting out said rheostat and passing additional current through said lamp; and connections associated with said first and second named circuits for passing current from said second named circuit to said first named circuit and through said lamp, substantially as described.

3. In a signaling means for motor vehicles the combination of an electric lamp adapted to serve as a tail light and as an emergency signal; a circuit provided with a switch and with a rheostat adapted to light said lamp when serving as a tail lamp; a second circuit comprising an electro-magnetic device adapted to cut out said rheostat from said first circuit; a pair of contacts under the control of the operator for opening and closing said second circuit; and means joining said second and first named circuits to supply current to said lamp when said switch is open, substantially as described.

4. In a signaling means for motor vehicles, the combination of an electric lamp provided with transparent front and side portions separated by an opaque band, adapted to serve as a tail light and as an emergency signal; a circuit for said lamp including a switch and a resistance, said resistance being sufficient to limit the intensity of said light to such an extent that the rays of said light are visible through the front transparent portion only of said lamp; a second circuit under the control of the driver of the vehicle including an electromagnetic device adapted to cut out said resistance and to thereby cause such an increase in the intensity of said light as to make the rays of said light visible through both the front and side transparent portions of said lamp; a pair of contacts under the control of the operator for opening and closing said second circuit; and means joining said first and second named circuits to supply current to said lamp when said switch is open.

In testimony whereof I affix my signature.

PHILIP MALCAMP.